United States Patent [19]

Dunn et al.

[11] Patent Number: 5,668,991
[45] Date of Patent: Sep. 16, 1997

[54] DATABASE MANAGEMENT SYSTEM

[75] Inventors: Stephen Dunn, Levenshulme; Peter Kelbie, Guildford, both of England

[73] Assignee: International Computers Limited, London, United Kingdom

[21] Appl. No.: 385,912

[22] Filed: Feb. 9, 1995

[30] Foreign Application Priority Data

Mar. 31, 1994 [GB] United Kingdom .................. 9406564

[51] Int. Cl.$^6$ ............................................ G06F 17/30
[52] U.S. Cl. ...................... 395/618; 395/607; 395/616; 395/617
[58] Field of Search .................. 395/600, 607, 395/616, 617, 618

[56] References Cited

U.S. PATENT DOCUMENTS

| | | | |
|---|---|---|---|
| 4,752,910 | 6/1988 | Yen et al. | 364/900 |
| 4,819,156 | 4/1989 | Delorme et al. | 364/200 |
| 5,043,871 | 8/1991 | Nishigaki et al. | 364/200 |
| 5,347,653 | 9/1994 | Flynn et al. | 395/600 |
| 5,379,398 | 1/1995 | Cohn et al. | 395/425 |

*Primary Examiner*—Thomas G. Black
*Assistant Examiner*—Jean M. Corrielius
*Attorney, Agent, or Firm*—Lee, Mann, Smith, McWilliams, Sweeney & Ohlson

[57] ABSTRACT

A database system is described in which changes to a database file are recorded in a journal file. The journal file comprises a sequence of after-image records each having a database identifier indicating which database record it relates. Periodically, a dump is taken of the database. At regular intervals, between dumps the journal file is merged with any previously archived journal file to form a merged file, the records are sorted into order of their database identifiers and the merged file is filtered to remove all but the latest after-image record relating to each particular database record. The filtered journal file is archived. If the database file is corrupted, it can be recovered by applying the filtered journal file to a dump file. Because the journal file has been filtered, recovery is faster. The filtered journal can also be used for performing an off-line integrity check on the reconstructed database file.

4 Claims, 3 Drawing Sheets

DATABASE MANAGEMENT SYSTEM

BACKGROUND TO THE INVENTION

This invention relates to database management systems. More specifically, the invention is concerned with ensuring integrity of a database.

It is well known to perform periodic dumps of a database, and to maintain a journal file, recording changes that have been made to the database since the last dump. Then, if a failure occurs, causing loss of information in the database, the database can be reconstructed by taking the last dump, and rolling it forward by applying the changes in the journal file.

A problem with this is that rolling the database forward can take a long time. Moreover, it usually has to be done when time is at a premium, when the recovery is taking place after a crash.

The object of the present invention is to provide a way of overcoming this problem.

SUMMARY OF THE INVENTION

According to the invention there is provided a database system comprising:

(a) a database file comprising a plurality of database records, each record having a database identifier;

(b) means for updating said database file, and forming a journal file comprising a sequence of after-image records, each having a database identifier indicating which database record it relates to; and (c) journal filtering means for processing the journal file to sort the after-image records into order of their database identifiers and to remove all but the latest after-image record relating to each database record.

As will be shown, the journal filtering mechanism streamlines the journal, allowing roll-forward to be performed much more quickly than by using an unfiltered journal.

Another problem which arises in database systems is that of performing integrity checks on the database. Conventionally, while an integrity check is performed, it is necessary to prevent any updating of the database so as to ensure that the integrity check is performed on a consistent image of the database. However, this means that the database system is effectively out of action while the integrity check is being performed.

According to a preferred feature of the present invention, integrity checking is performed using a database dump and a filtered journal file. Thus, the database file may still be updated while the integrity check is being performed.

DESCRIPTION OF AN EMBODIMENT OF THE INVENTION

One embodiment of the invention will now be described by way of example with reference to the accompanying drawings.

Figure 1:
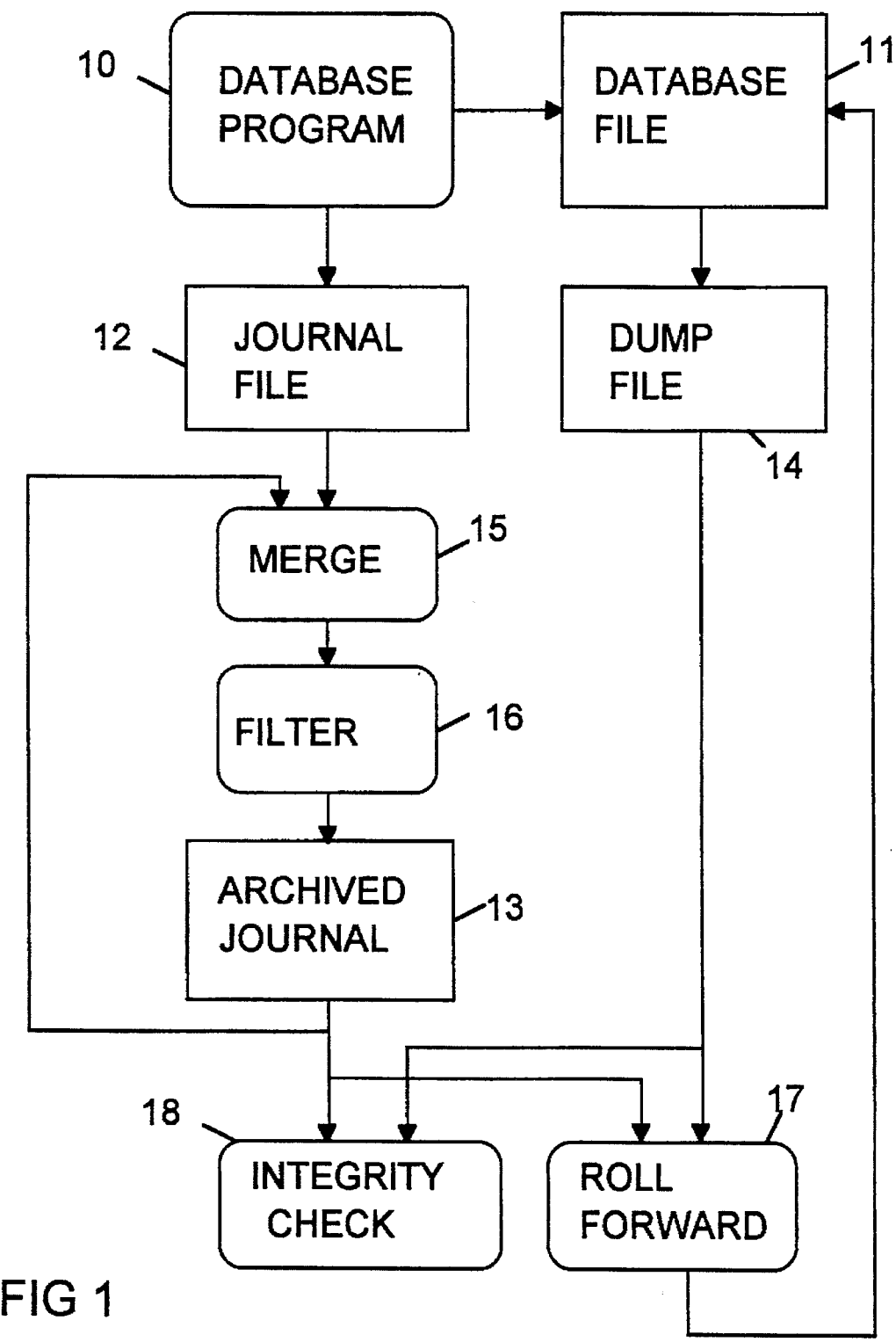
FIG. 1 is a block diagram showing a database system embodying the invention.

Referring to FIG. 1, the database system includes a database program 10, which maintains a database file 11. The database file consists of a number of pages, each of which contains a number of records. Each record has a database key, which uniquely identifies that record. The structure of the database program and the database file form no part of the present invention, and so will not be described in detail herein.

Whenever the database program completes a transaction which updates a page of the database file, it writes a block to a sequential journal file 12. The block contains a block header, a bit map record, and one or more after-image records. The bit map record contains the page number, and a string of bits indicating which records within the page have been updated: bit n is set if record n has been updated. An after-image record is included for each database record that has been updated in the page. Each after image record contains the database key that identifies the database record, and the new value of the database record. It will be appreciated that, over a period of time, several updates may be made to a given database record. Hence, the journal file will, in general, contain a number of successive after images for each updated record. However, the final state of the database depends only on the latest update to each record.

The system also uses an archived journal file 13. The way in which this archived journal file is updated and used will be described below.

At regular intervals, the database program creates a dump file 14, containing a copy of the current state of the database file 11. At the same time, a new, empty journal file 12 is created, to record incremental updates subsequent to the dump. Once a successful dump has been taken, any existing archived journal 13 becomes redundant and is deleted.

At regular intervals, between dumps, the current journal file 12 is replaced by a new, empty journal file. The replaced journal file is merged into the existing archived journal 13 (if any) by means of a merge procedure 15, and the merged journal is processed, by means of a journal filter program 16, to produce a filtered journal file. This filtered journal is then archived, replacing the existing archived journal 13. As will be described, the journal filter program 16 streamlines the journal file, eliminating any after-image records that have been superseded, and hence the filtered journal file 13 contains only the latest after image for each record. Moreover, the records in the filtered journal file are stored in increasing order of database key. This processing of the journal file may be performed at any convenient time, when the host system is not busy.

In the event of a database file failure, the database system performs a recovery procedure as follows. First, the current journal file 12 is replaced by a new, empty journal file. The replaced journal file is then merged, filtered and archived as described above. The dump file 14 is then accessed. A roll forward program 17 is then run, to apply each record of the archived journal 13 to the dump file 14, so as to recreate the database file 11. It will be appreciated that, because the archived journal has been streamlined by the journal filter program, this roll forward process can be performed much more quickly than by using unfiltered journals.

An integrity check can be performed on the database at any time, as follows. First, a dump is performed, to create a new dump file 14. When the dump is successfully completed, the current journal 12 is replaced, merged, filtered and archived as described above. This archived journal file 13 now contains any updates made to the database while the dump was being taken. An integrity check program 18 is then run. The integrity check program takes each record from the dump file in turn, applies any updates to it from the archived journal file, and tests the integrity of the updated record.

It can be seen that the integrity check is performed using the dump file and filtered journal file, rather than by using the actual database file. The advantage of this is that it allows the integrity check to be performed off-line, while the database program 10 is still running and updating the database file 11. It is not necessary to suspend the normal operation of the database system while the integrity check is performed. The use of the dump and filtered journal files to perform an integrity check is feasible because of the streamlining of the filtered journal file.

The journal filter program 16 comprises an input procedure, a sort procedure, and an output procedure.

Figure 2:
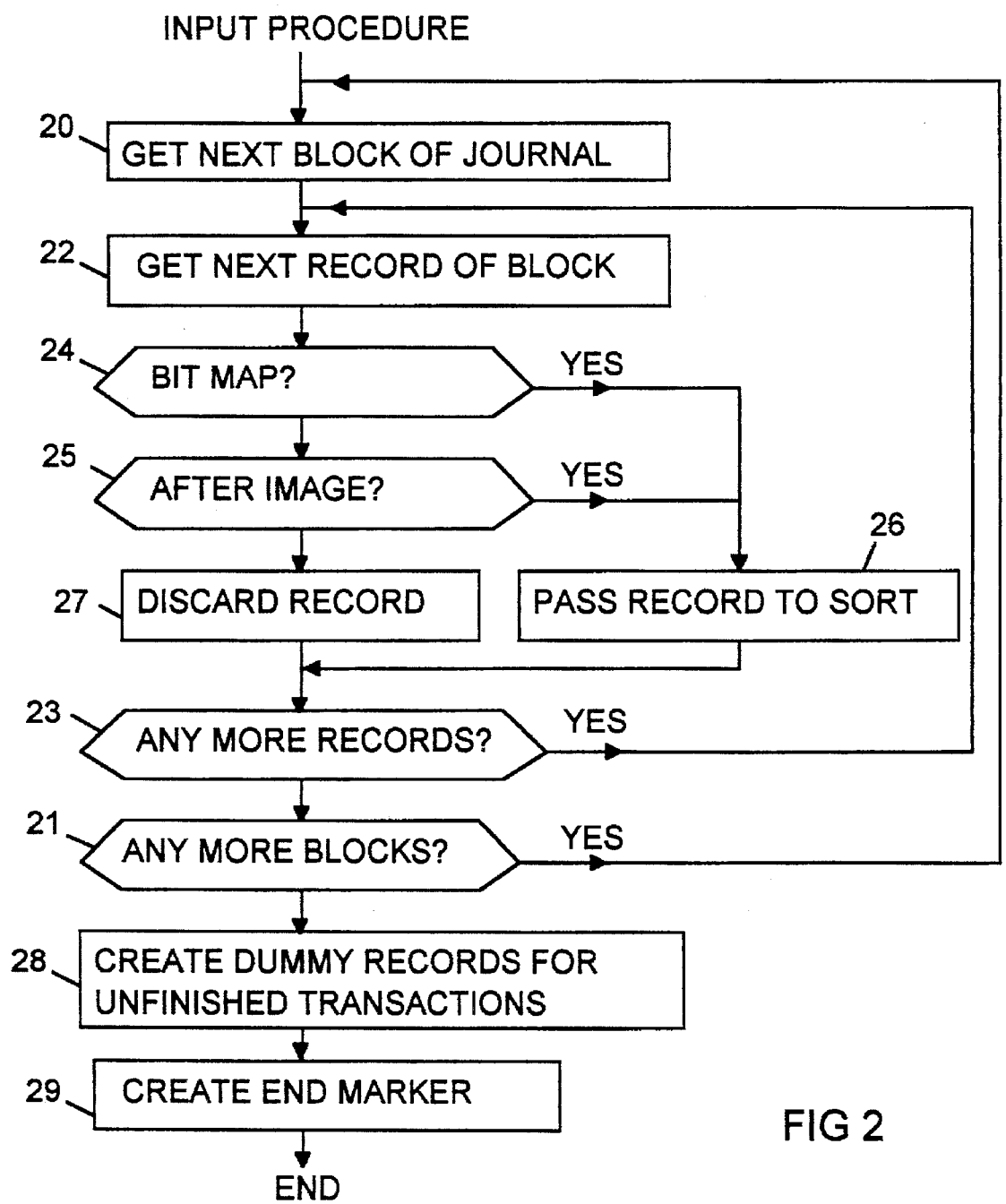
FIG. 2 and 3 are flowcharts showing a journal filter forming part of the database system.

The input procedure is shown in FIG. 2. This procedure comprises an outer loop (boxes 20,21) which selects each block in the journal file in turn, and an inner loop (boxes 22,23) which gets each record in the selected block in turn. For each record, the procedure tests whether the record is a bitmap (box 24), or an after image (box 25). If so, the record is passed to the sort procedure (box 26). Otherwise, the record is discarded (box 27).

When all the blocks have been processed (box 28), the input procedure checks whether there are any unfinished transactions being performed by the database program. The procedure creates a dummy record with database key equal to 0 for each unfinished transaction, and passes it to the sort procedure.

Finally (box 29), the input procedure creates an end of file marker record, and passes it to the sort procedure.

The sort procedure sorts the records passed to it into ascending order of database key. It will be seen that the sort procedure groups together all the dummy records (with database key equal to 0) at the top of the sorted file. The sort also groups together all after-image records relating to each particular database key. The after-image records within each such group are arranged in order of the time they were written, starting with the oldest. The sort also groups together all bit map records relating to each particular page. Each group of bit map records precedes the after-image records to which they relate. The end of file marker will be at the end of the sorted file. The sort procedure is conventional, and so will not be described in detail herein.

Figure 3:
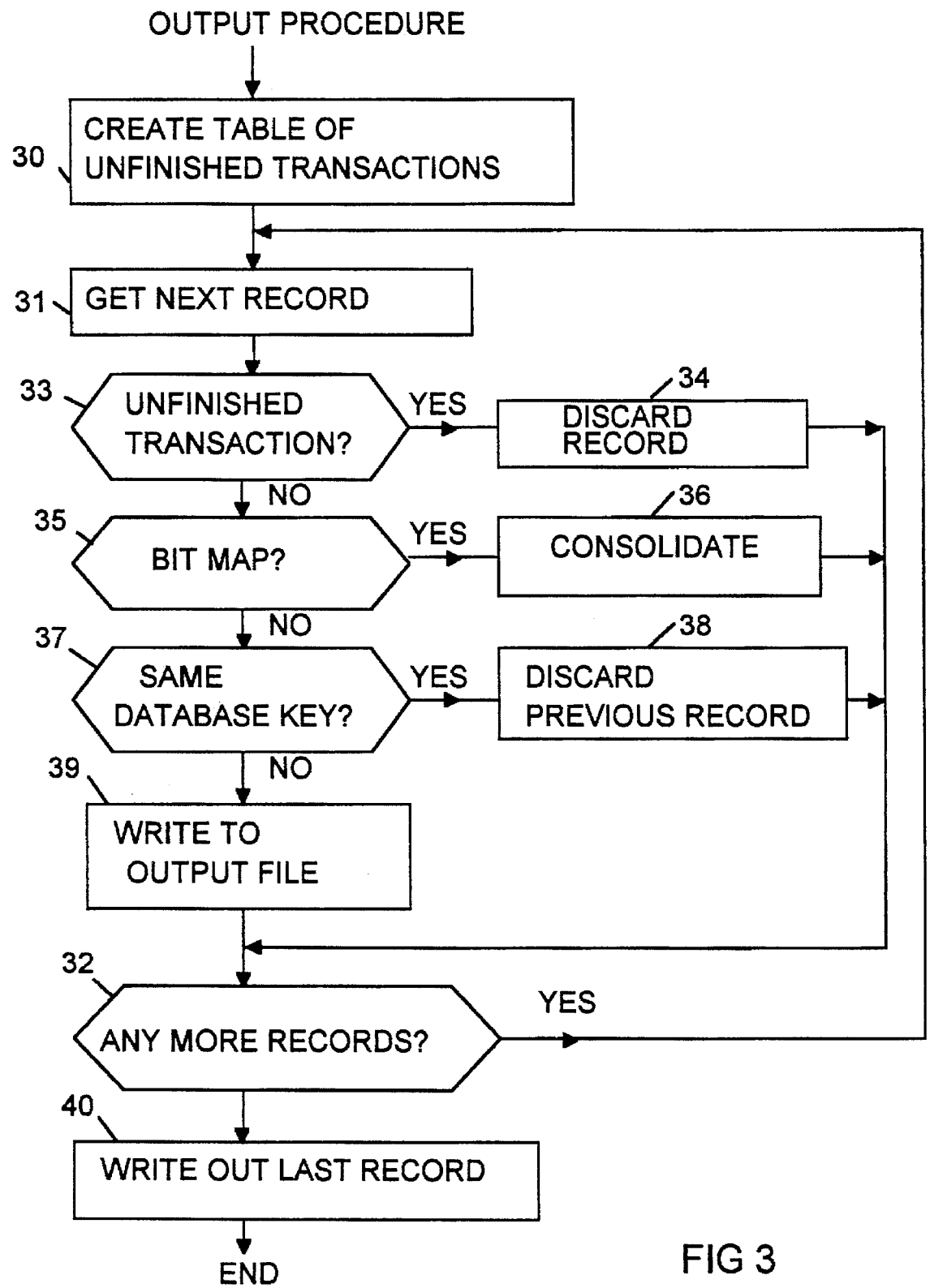

The output procedure is shown in FIG. 3. This procedure receives the sorted records from the sort procedure. First (box 30), it creates a table of unfinished transactions, using the records with database key equal to 0. It then performs a loop (boxes 31,32) in which it gets each subsequent record in the file. If the record is for an unfinished transaction (box 33), that record is discarded (box 34). If the record is a bitmap (box 35), then a bitmap consolidation (box 36) is performed. This involves scanning the following records, looking for other bitmaps relating to the same page, and consolidating all the bitmaps relating to this page, by performing a bit-by-bit logical OR function. This forms a single consolidated bit map record for the page. If the record is not an unfinished transaction or a bit map, the procedure then checks whether the database key for the current record is the same as for the preceding record (box 37). If so, the preceding record is discarded (box 38). Otherwise (box 39), the preceding record is written out into the filtered journal file, and the current record is saved (i.e. it now becomes the "previous record").

When all the records have been processed (box 40), the final record is written to the filtered journal file.

It should be noted that the filtering of a merged journal, formed by merging the current journal with a previously filtered archived journal, takes substantially less time than would be required if the archived journal had not been filtered, since part of the work of filtering has already been done.

We claim:

1. A database system comprising:
   (a) a database file comprising a plurality of database records, each record having a database identifier;
   (b) a database dump file comprising a copy of said database file at a particular point in time;
   (c) a journal file and an archived journal file, each comprising a sequence of after-image records, each said after-image record having a database identifier indicating which of said database records that record relates to;
   (d) means for performing a series of updates on said database file and, for each of said updates, writing an after-image record into said journal file;
   (e) means for periodically merging said journal file into said archived journal file and for filtering said archived journal file by sorting the after-image records in said archived journal file into order of their database identifiers and removing all but the latest after-image record relating to each database record; and
   (f) recovery means, operative in the event of a database failure, for applying said archived journal file to said database dump file, to reconstruct said database file.

2. A database system according to claim 1, further including integrity checking means for applying said archived journal file to each record of said database dump file, to form a series of reconstructed records, and for performing an integrity check on each of said reconstructed records in turn.

3. A method of operating a database system comprising the steps:
   (a) creating a database file comprising a plurality of database records, each record having a database identifier;
   (b) creating a database dump file comprising a copy of said database file at a particular point in time;
   (c) creating a journal file and an archived journal file, each comprising a sequence of after-image records, each said after-image record having a database identifier indicating which of said database records that record relates to;
   (d) performing a series of updates on said database file and, for each of said updates, writing an after-image record into said journal file;
   (e) periodically merging said journal file into said archived journal file and filtering said archived journal file by sorting the after-image records in said archived journal file into order of their database identifiers and removing all but the latest after-image record relating to each database record; and
   (f) in the event of a database failure, applying said archived journal file to said database dump file, to reconstruct said database file.

4. A method of operating a database system according to claim 3, including the further steps:
   (a) applying said archived journal file each record of said database dump file, to form a series of reconstructed records; and
   (b) performing an integrity check on each of said reconstructed records in turn.

* * * * *